(12) United States Patent
Carmel-Veilleux et al.

(10) Patent No.: US 9,001,039 B2
(45) Date of Patent: Apr. 7, 2015

(54) DEVICE WITH TOUCH SCREEN FALSE ACTUATION PREVENTION

(71) Applicant: Research In Motion Limited, Waterloo (CA)

(72) Inventors: Tennessee Carmel-Veilleux, Kitchener, CA (US); Zhe Chen, Waterloo (CN)

(73) Assignee: BlackBerry Limited, Waterloo, Ontario (CA)

( * ) Notice: Subject to any disclaimer, the term of this patent is extended or adjusted under 35 U.S.C. 154(b) by 161 days.

(21) Appl. No.: 13/623,916

(22) Filed: Sep. 21, 2012

(65) Prior Publication Data

US 2014/0085201 A1    Mar. 27, 2014

(51) Int. Cl.
*H04M 1/02* (2006.01)
*G06F 1/16* (2006.01)
*G06F 3/01* (2006.01)
*G06F 3/041* (2006.01)

(52) U.S. Cl.
CPC .............. *G06F 1/1694* (2013.01); *G06F 3/011* (2013.01); *G06F 3/0416* (2013.01); *G06F 2200/1637* (2013.01); *G06F 2203/0381* (2013.01)

(58) Field of Classification Search
CPC ... G06F 1/3203; G06F 1/3206; G06F 1/3215; H04M 2250/12; H04M 2250/22
USPC ................................... 345/158, 173; 702/150
See application file for complete search history.

(56) References Cited

U.S. PATENT DOCUMENTS

| | | | |
|---|---|---|---|
| 7,728,316 B2 * | 6/2010 | Fadell et al. | 250/559.38 |
| 7,747,293 B2 * | 6/2010 | Sutardja | 455/574 |
| 7,957,762 B2 * | 6/2011 | Herz et al. | 455/550.1 |
| 8,170,621 B1 | 5/2012 | Lockwood | |
| 8,600,430 B2 * | 12/2013 | Herz et al. | 455/550.1 |
| 2004/0233153 A1 | 11/2004 | Robinson | |
| 2007/0085157 A1 | 4/2007 | Fadell et al. | |
| 2007/0091070 A1 | 4/2007 | Larsen et al. | |
| 2008/0167834 A1 * | 7/2008 | Herz et al. | 702/150 |
| 2010/0216447 A1 * | 8/2010 | Park et al. | 455/418 |
| 2012/0154292 A1 * | 6/2012 | Zhao et al. | 345/173 |
| 2012/0214542 A1 * | 8/2012 | Sarin et al. | 455/550.1 |
| 2012/0306770 A1 * | 12/2012 | Moore et al. | 345/173 |

FOREIGN PATENT DOCUMENTS

WO       2009102340 A1    8/2009

OTHER PUBLICATIONS

Corresponding European Patent Application No. 12185454.1 Search Report dated Mar. 5, 2013.

* cited by examiner

*Primary Examiner* — Quan-Zhen Wang
*Assistant Examiner* — Xuemei Zheng
(74) *Attorney, Agent, or Firm* — Perry + Currier, Inc.

(57) ABSTRACT

A device and method for preventing false-actuation of a touch screen are provided. When one or more of: (a) an initial proximity event occurs at a proximity sensor of the device, and (b) a reorientation event occurs at an orientation sensor of the device: touch data received via a touch screen of the device is buffered in a memory of the device. Thereafter, a processor of the device: processes the buffered touch data when a further proximity event does not occur within a given time period; and, disables the touch screen when the proximity event occurs within the given time period.

14 Claims, 6 Drawing Sheets

DEVICE WITH TOUCH SCREEN FALSE ACTUATION PREVENTION

FIELD

The specification relates generally to touch screen devices, and specifically to a device with touch screen false-actuation prevention and method therefor.

BACKGROUND

On touch screen enabled devices, false actuation of the touch screen can occur when the device is held to a face, ear and the like, when a device is initially brought to an ear of a user to conduct a phone call and/or listen to sound from a speaker of the device.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
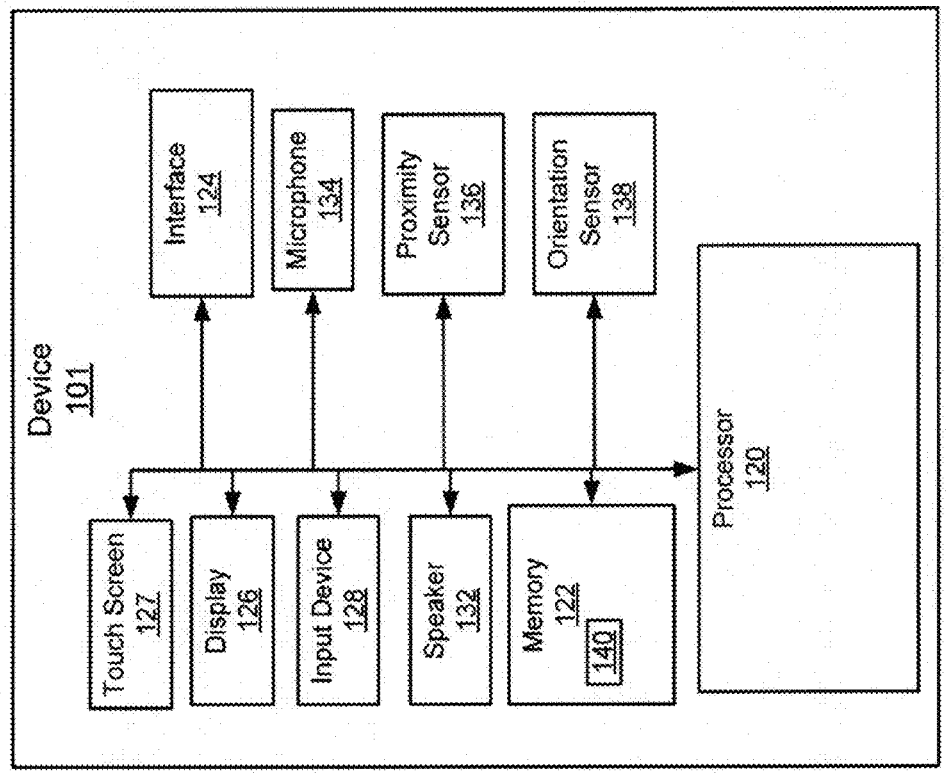
FIG. 1 depicts a device with touch screen false-actuation prevention, according to non-limiting implementations.

An aspect of the specification provides a device comprising: a processor coupled to a memory, a display including a touch screen for detecting touch events at the display, an orientation sensor, and a proximity sensor, the processor enabled to: when one or more of: (a) an initial proximity event occurs at the proximity sensor, and (b) a reorientation event occurs at the orientation sensor: buffer in the memory touch data received via the touch screen; and, thereafter: process the buffered touch data when a further proximity event does not occur within a given time period; and, disable the touch screen when the proximity event occurs within the given time period.

The processor can be further enabled to discard the buffered touch data when the proximity event occurs within the given time period.

The proximity sensor can be located adjacent one or more of the touch screen and a speaker.

The given time period can be one or more of: less than or about equal to a sampling latency period of the proximity sensor; less than about 100 ms; and less than about 400 ms.

When the processor determines that the initial proximity event has occurred at the proximity sensor, the given time period can be less than when the processor determines that the reorientation event has occurred at the orientation sensor.

The processor can be further enabled to turn off the display when the proximity event occurs within the given time period.

The processor can be further enabled to not turn off the display within a sampling latency period of the proximity sensor.

The orientation sensor can comprise one or more of an accelerometer, a gyroscope and a magnetometer.

The reorientation event can be indicative of a change in orientation from one of a face-up orientation and face-down orientation to one of a top-up orientation, a left-up orientation and a right-up orientation.

The proximity sensor can comprise one or more of an infrared proximity sensor, a light-based proximity sensor, a sonar proximity sensor and an acoustic-based proximity sensor.

Another aspect of the specification provides a method comprising: when one or more of: (a) an initial proximity event occurs at a proximity sensor of a device, and (b) a reorientation event occurs at an orientation sensor of a device: buffer, in a memory of the device, touch data received via a touch screen of the device; and, thereafter: process, at a processor of the device, the buffered touch data when a further proximity event does not occur within a given time period; and, disable the touch screen when the proximity event occurs within the given time period.

The method can further comprise discarding the buffered touch data when the proximity event occurs within the given time period.

The given time period can be one or more of: less than or about equal to a sampling latency period of the proximity sensor; less than about 100 ms; and less than about 400 ms.

When the processor determines that the initial proximity event has occurred at the proximity sensor, the given time period is less than when the processor determines that the reorientation event has occurred at the orientation sensor.

The method can further comprise turning off the display when the proximity event occurs within the given time period. The method can further comprise not turning off the display within a sampling latency period of the proximity sensor.

The reorientation event can be indicative of a change in orientation from one of a face-up orientation and face-down orientation to one of a top-up orientation, a left-up orientation and a right-up orientation.

Yet a further aspect of the specification provides a computer program product, comprising a computer usable medium having a computer readable program code adapted to be executed to implement a method comprising: when one or more of: (a) an initial proximity event occurs at a proximity sensor of a device, and (b) a reorientation event occurs at an orientation sensor of a device: buffer, in a memory of the device, touch data received via a touch screen of the device; and, thereafter: process, at a processor of the device, the buffered touch data when a further proximity event does not occur within a given time period; and, disable the touch screen when the proximity event occurs within the given time period. The computer usable medium can comprise a non-transitory computer useable medium.

FIG. 1 depicts a schematic diagram of a device 101 with touch screen false-actuation prevention, according to non-limiting implementations. Device 101 comprises a processor 120 interconnected with a memory 122, a communications interface 124, a display 126 including a touch screen 127 for detecting touch events at display 126, one or more optional input devices 128, a speaker 132, a microphone 134, at least one proximity sensor 136 and at least one orientation sensor 138. Communications interface 124 will be interchangeably referred to as interface 124. Further, at least one proximity sensor 136 and at least one orientation sensor 138, will be interchangeably referred to as proximity sensor 136 and orientation sensor 138. As will be presently explained, processor 120 is generally enabled to: when one or more of: (a) an initial proximity event occurs at proximity sensor 136, and (b) a reorientation event occurs at orientation sensor 138: buffer in memory 122 touch data received via touch screen 127; and, thereafter: process the buffered touch data when a further proximity event does not occur within a given time period; and, disable touch screen 127 when the proximity event occurs within the given time period. The buffered touch data, when present, can also be discarded.

Device 101 can be any type of electronic device that can be used in a self-contained manner using touch screen 127 as an input device. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony functions, device 101 can be used for any suitable specialized functions, including, but not limited, to one or more of, telephony, computing, appliance, and/or entertainment related functions.

Device 101 is generally enabled to receive input at touch screen 127, for example via detected touch events. Touch screen 127 can include, but is not limited to, any suitable combination of capacitive and resistive touch screens, and the like. It is further appreciated that touch screen 127 is generally transparent and is located adjacent display 126, and aligned therewith, such that selections of an item provided at display 126 (e.g. a rendered virtual button and the like) can be detected via detection of a touch event at touch screen 127 in an area corresponding to the area of the item at display 126.

Optional input device 128 is generally enabled to receive input data, and can comprise any suitable combination of input devices, including but not limited to a keyboard, a keypad, a pointing device, a mouse, a track wheel, a trackball, a touchpad, and the like. Other suitable input devices are within the scope of present implementations.

Input from touch screen 127 (and/or one or more optional input devices 128) is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

In particular, it is appreciated that memory 122 stores an application 140 that, when processed by processor 120, enables processor 120 to: when one or more of: (a) an initial proximity event occurs at proximity sensor 136, and (b) a reorientation event occurs at orientation sensor 138: buffer in memory 122 touch data received via touch screen 127; and, thereafter: process the buffered touch data when a further proximity event does not occur within a given time period; and, disable touch screen 127 when the proximity event occurs within the given time period. The buffered touch data, when present, can also be discarded.

Processor 120 can be further enabled to communicate with display 126, and microphone 134 and speaker 132. Display 126 comprises any suitable one of, or combination of, CRT (cathode ray tube) and/or flat panel displays (e.g. LCD (liquid crystal display), plasma, OLED (organic light emitting diode).

Microphone 134 comprises any suitable microphone for receiving sound and converting the sound into sound data. Speaker 132 comprises any suitable speaker for providing sound data, audible alerts, audible communications from remote communication devices, and the like, at device 101.

Processor 120 also connects to interface 124, which can be implemented as one or more radios and/or connectors and/or network adaptors, enabled to wirelessly communicate with one or more communication networks (not depicted). It will be appreciated that interface 124 is enabled to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WiFi links, WiMax links, packet based links, the Internet, analog networks, the PSTN (public switched telephone network), access points, and the like, and/or a combination.

At least one proximity sensor 136 can comprise any suitable proximity sensor, including, but not limited to, any suitable combination of IR (infrared) diode/detectors (including but not limited to reflectance IR proximity sensors and time-of-flight proximity sensors), capacitive sensors, capacitive displacement sensors, Doppler effect sensors, eddy-current sensor, inductive sensors, laser sensors, optical sensors, acoustic sensors, sonar sensors, magnetic sensors, passive optical sensors (such as charge-coupled devices), passive thermal infrared sensors, and photocell sensors (reflective). In general, at least one proximity sensor 136 is enabled to detect proximity of objects, as described below with reference to FIGS. 2 and 3.

At least one orientation sensor 138 can comprise any suitable orientation sensor, including, but not limited to, any suitable combination of magnetometers, gyroscopes, accelerometers, and the like. In general, at least one orientation sensor 138 is enabled to detect one or more of an orientation of device 101 and a reorientation of device 101. For example, at least one orientation sensor 138 can be generally enabled to detect reorientation events. In particular, reorientation events can be detected that are indicative of a change in orientation of device 101 from one of a face-up orientation and face-down orientation to one of a top-up orientation, a left-up orientation and a right-up orientation. Further, the indicated orientations are generally appreciated to be relative to the ground: for example, a face-up orientation indicates that display 126 and/or touch screen 127 is oriented upwards, away from the ground, while a face-down orientation indicates that display 126 and/or touch screen 127 is oriented downwards, towards the ground. Similarly, each of the top-up orientation, the left-up orientation and the right-up orientation respectively indicate that a top side of device 101 (e.g. relative to display 126), a right side of device 101 (e.g. relative to display 126) and a left side of device 101 (e.g. relative to display 126) are oriented upward, away from the ground. At least one orientation sensor 138 is hence enabled to detect an orientation of device 101, and further detect when a reorientation event occurs, a reorientation event comprising an event where device 101 changes orientation, relative to the ground.

It is further appreciated that device 101 is more likely to be in an in-use orientation for phone calls and/or when a user listening to speaker 132, when device 101 is in top-up orientation, a left-up orientation and a right-up orientation, and a change in orientation from one of a face-up orientation and face-down orientation to one of a top-up orientation, a left-up orientation and a right-up orientation can indicate that device 101 is about to be used in a given manner, wherein a proximity event is likely to occur, for example device 101 being held to an ear of a user.

Furthermore, reorientation events can be determined via any suitable orientation sensor data, including, but not limited to changes in gyroscope rotation rate and changes in accelerometer acceleration magnitude and the like.

In some implementations, display 126, touch screen 127, input device 128, at least one proximity sensor 136 and at least one orientation sensor 138 are external to device 101, with processor 120 in communication with each of display 126, touch screen 127, input device 128, at least one proximity sensor 136 and at least one orientation sensor 138 via a suitable connection and/or link. In these implementations, it is appreciated that display 126, touch screen 127, input device 128, at least one proximity sensor 136 and at least one orientation sensor 138 are integrated and that orientation sensor 138 is enabled to detect reorientation of touch screen 127, while proximity sensor 136 is enabled to detect proximity of objects to touch screen 127.

It is yet further appreciated that device 101 comprises a power source (not depicted), for example a battery or the like. In some implementations the power source can comprise a connection to a mains power supply and a power adaptor (e.g. and AC-to-DC (alternating current to direct current) adaptor).

In any event, it should be understood that a wide variety of configurations for device 101 are contemplated.

Figure 2:
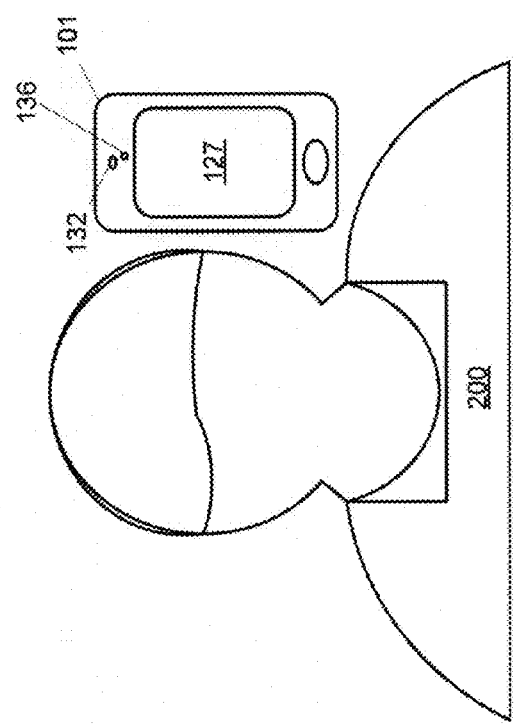
FIG. 2 depicts the device of FIG. 1 in use, according to non-limiting implementations.

With reference to FIG. 2, which depicts device 101 being used by a user 200, proximity sensor 136 can be located at any position on device 101 for detecting proximity of objects to one or more of touch screen 127 and speaker 132, including but not limited to a head and/or ear and/or cheek of user 200. For example, proximity sensor 136 can be located adjacent one or more of touch screen 127 and speaker 132 such that a proximity event occurs at proximity sensor 136 when a head, etc. of a user is adjacent touch screen 127 and/or speaker 132. In other words, proximity sensor 136 is located at device 101 so that proximity events occur at proximity sensor 136 when user 200 is holding speaker 132 of device 101 to his/her ear. It is appreciated that a proximity event comprises a detection of proximity at proximity sensor 136.

Figure 3:
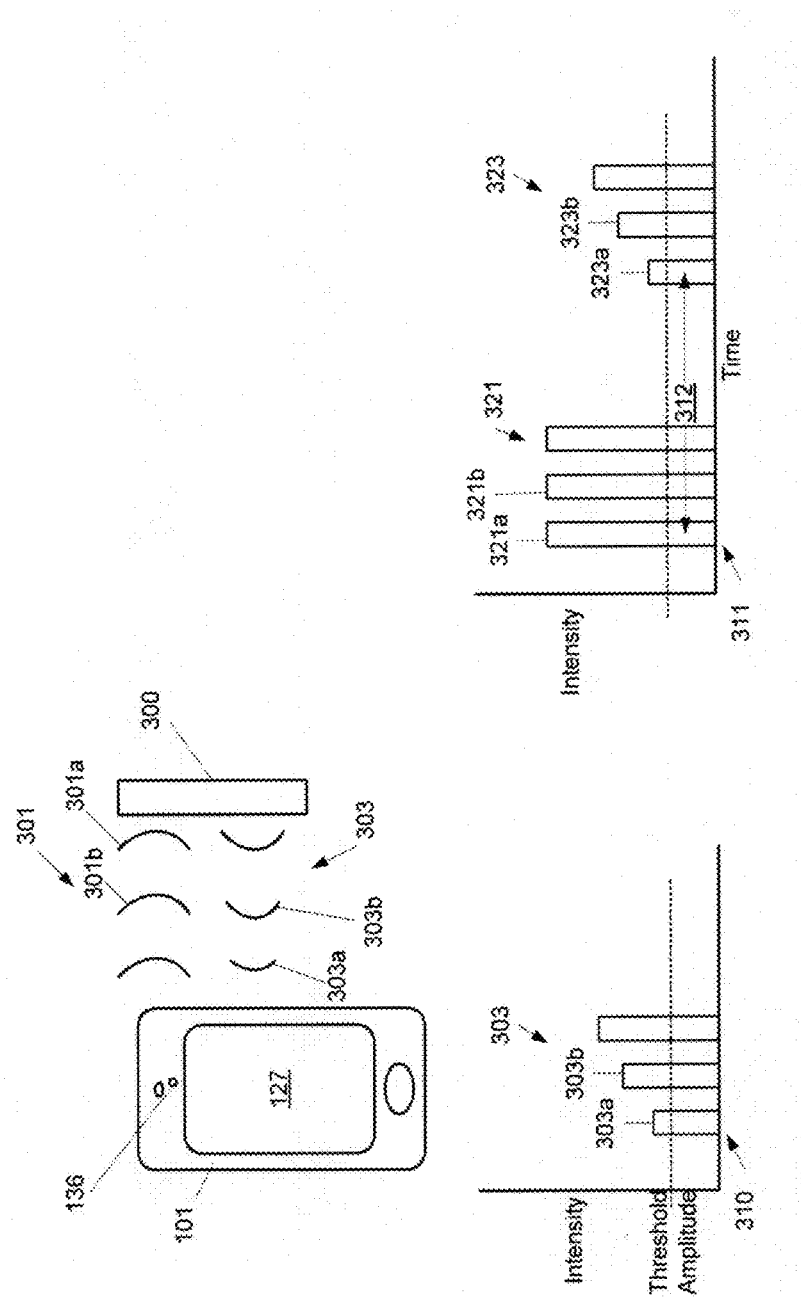
FIG. 3 depicts proximity detection at the device of FIG. 1, according to non-limiting implementations.

With reference to FIG. 3, which depicts device 101 detecting proximity to an object 300 (for example user 200), it is appreciated that proximity sensor 136 can transmit signals 301 through air (including, but not limited to, one or more of infrared signals, light signals, sonar signals and acoustic signals), that can reflect from object 300 producing return signals 303. One or more of an amplitude of an initial return signal 303a and a time between transmitting an initial signal 301a and receiving an initial return signal 303a can be indicative of proximity of object 300 (which can include user 200 and the like). Indeed, when an amplitude of initial return signal 303a is above a threshold amplitude, processor 120 can determine that an initial proximity event has occurred at proximity sensor 136; alternatively, when a time between transmitting initial signal 301a and receiving initial return signal 303a is below a threshold time, processor 120 can determine that an initial proximity event has occurred at proximity sensor 136.

For example, it is yet further appreciated that when proximity sensor 136 comprises an IR reflectance proximity sensor, processor 120 can determine that a proximity event has occurred when an amplitude of return signals 303 is above a threshold amplitude, as measured by the IR reflectance proximity (e.g. relative to ambient IR). Indeed, FIG. 3 further depicts a graph 310 of signals 303 received by an IR reflectance proximity sensor, with the y-axis indicative of intensity of signals 303 and (though an IR reflectance sensor does not generally track time of received signals), the x-axis indicative of a time at which each signal 303 is received. It is yet further appreciated that IR reflectance proximity sensors can emit signals for reflectance with an emitting period that is on the order of about tens to about hundreds of microseconds, and IR radiation reflected from objects (such as object 300) is returned back to the IR reflectance sensor as return signals 303. Further, from graph 310, it is appreciated that when return signals 303 are above a threshold amplitude, an object (such as object 300) is in proximity to proximity sensor 136 and/or device 101 and/or touch screen 127, and it can be determined that a proximity event has occurred. In other words, it can be predetermined that objects that are less than a given distance (in a non-limiting example, about 4 cm) from proximity sensor 136 are proximal to device 101; the threshold amplitude is appreciated to be based on an amplitude of return signals when an object (e.g. object 300) is a given distance from device 101, and can be determined experimentally. Further, the threshold amplitude can be stored at memory 122. From graph 310, it is further appreciated that each successive return signal 303 has a higher amplitude than a previous signal 303, thereby indicating that object 300, or the like, is getting closer to device 101 in each time period between signals 303: i.e. signal 303a has a lower amplitude than signal 303b. It is yet further appreciated that when signal 303a is measured, processor 120 determines that an initial proximity event has occurred. Further, in implementations where proximity sensor 136 comprises an IR reflectance proximity sensor, the time of return of signals 303 is not necessarily measured.

However, FIG. 3 also depicts a graph 311 showing signalling (again, intensity vs. time) of transmitted signals 321 and return signals 323 for an IR time-of-flight proximity sensor. In these implementations, a time 312 between transmitting an initial signal 321a and receiving initial return signal 323a can be determined, and when time 312 is below a threshold time (which can be based on one or more of a time for initial signal 321a to travel from proximity sensor 136 to an object at a given distance and back to proximity sensor 136 as reflected signal 323a, and a time for proximity sensor 136 to generate, transmit, receive and process signals 321, 323), processor 120 can determined that a proximity event has occurred. In other words, when an initial signal 321a is transmitted and an initial return signal 323a is received within a given period that is less than or about equal to the threshold time, processor 120 can determine that an initial proximity event has occurred at proximity sensor 136.

However, whether an initial proximity event has been determined via amplitude techniques and/or time-of-flight techniques, processor 120 generally does not then place device 101 into a proximity mode. Rather, an initial return signal could be due to stray light, stray sound and the like, and not due to reflection of an initial signal. Alternatively, return signal could be due to a finger, a piece of paper, or other object temporarily placed in front of proximity sensor 136. Hence, processor 120 does not generally place device 101 into a proximity mode until at least one further proximity event occurs at proximity sensor 136 (i.e. to confirm proximity) for example, when either an amplitude of at least a next return signal 303b/323b is above the threshold amplitude and/or when a time 312 between at least a next transmitted signal 321b and the next return signal 323b is less than the threshold time. In other words, at least two proximity events occur in a row before processor 120 determines that device 101 is proximal an object and places device 101 into a proximity mode.

In the proximity mode, touch screen 127 is generally disabled and display 126 is optionally turned off, until proximity is no longer detected (e.g. no return signals 303/323 are detected and/or return signals 303/323 are below a threshold amplitude and/or a time between transmitted signals 321 and return signals 323 is above the threshold time), touch screen 127 is enabled and display 126 is turned back on (when previously turned off).

It is furthermore appreciated that the time between detecting an initial proximity event and a next proximity event (and/or processor 120 placing device 101 into a proximity mode) can be referred to as the sampling latency period. It is appreciated that time for processing proximity data can contribute to the sampling latency period.

Figure 4:
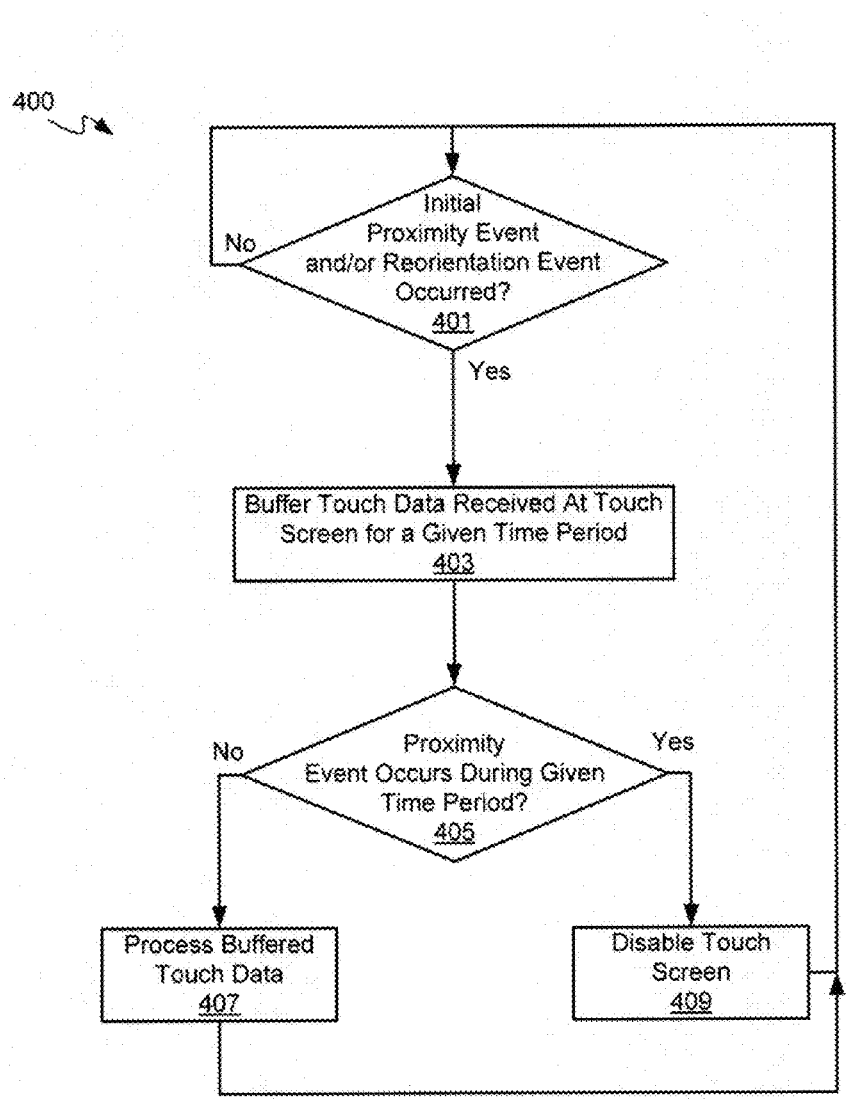
FIG. 4 depicts a method of preventing false-actuation of a touch screen, according to non-limiting implementations.

Hence attention is now directed to FIG. 4 which depicts a flowchart of a method 400 for preventing false-actuation of a touch screen 127, for example during the sampling latency period, according to non-limiting implementations. In order to assist in the explanation of method 400, it will be assumed that method 400 is performed using device 101. Furthermore, the following discussion of method 400 will lead to a further understanding of device 101 and its various components. However, it is to be understood that device 101 and/or method 400 can be varied, and need not work exactly as discussed herein in conjunction with each other, and that such variations are within the scope of present implementations.

It is appreciated that, in some implementations, method 400 is implemented in device 101 by processor 120 processing application 140. Indeed, method 400 is one way in which device 101 can be configured. It is to be emphasized, however, that method 400 need not be performed in the exact sequence as shown, unless otherwise indicated; and likewise various blocks may be performed in parallel rather than in sequence; hence the elements of method 400 are referred to herein as "blocks" rather than "steps". It is also to be understood, however, that method 400 can be implemented on variations of device 101 as well.

Figure 5:
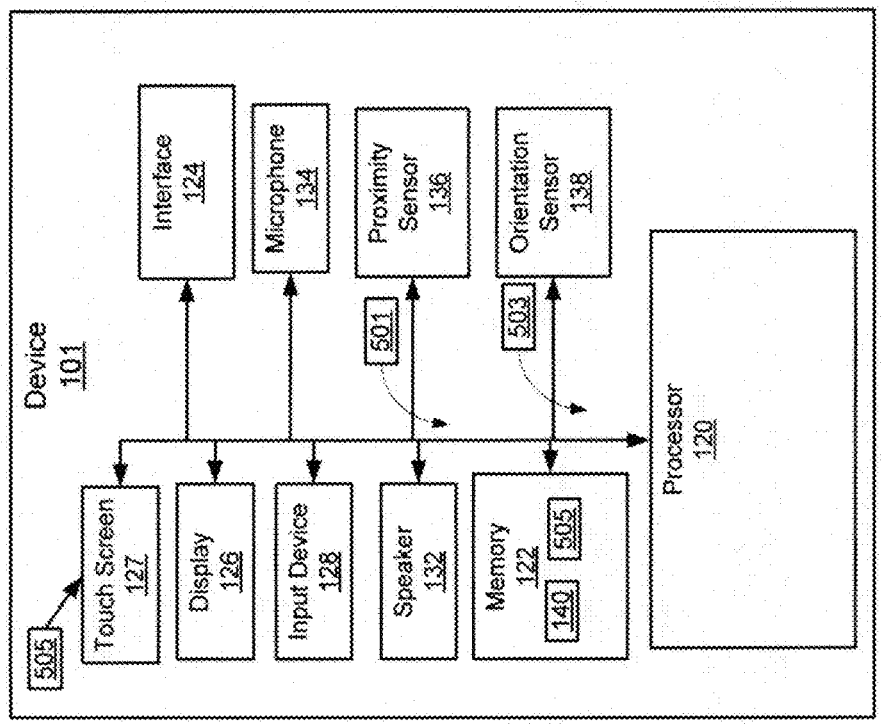
FIG. 5 depicts the device of FIG. 1 detecting proximity events and reorientation events, and buffering touch data, according to non-limiting implementations.
Figure 6:
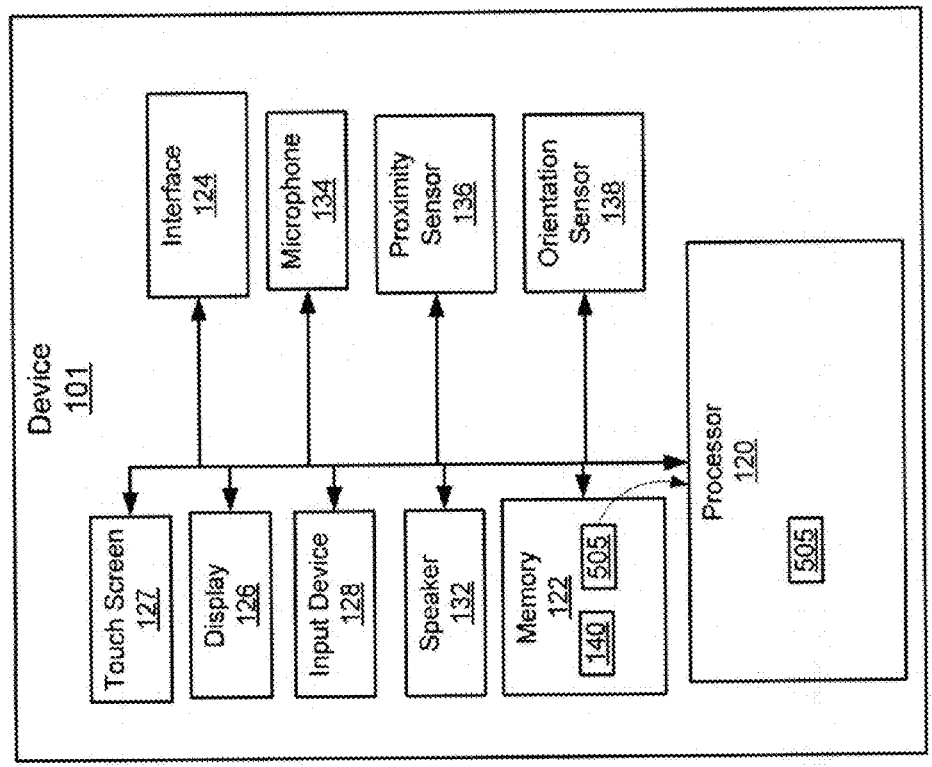
FIG. 6 depicts the device of FIG. 1 processing touch data once no proximity events occur within a given time period, according to non-limiting implementations.

Further, the following discussion of method 400 will be done with reference to FIGS. 5 and 6, each of which is similar to FIG. 1, with like elements having like numbers.

At block 401, processor 120 determines whether one or more of (a) an initial proximity event has occurred at proximity sensor 136 and (b) a reorientation event has occurred at orientation sensor 138. In other words, at block 401 it is determined whether an initial proximity event has occurred at proximity sensor 136 and/or whether a reorientation event has occurred at orientation sensor 138: one or both events could occur. When no events occur (i.e. a "No" decision at block 401), block 401 repeats until an event occurs (i.e. a "Yes" decision at block 401). For example, in FIG. 5, processor 120 receives proximity data 501 from proximity sensor 136 after an initial proximity event is detected at proximity sensor 136, as described above.

Further in FIG. 5, processor 120 receives reorientation data 503 from orientation sensor 138 after an orientation event is detected at orientation sensor 138: for example, the reorientation event and/or reorientation data 503 is indicative of a change in orientation of device 101 (and/or touch screen 127) from one of a face-up orientation and face-down orientation to one of a top-up orientation, a left-up orientation and a right-up orientation. In other words, processor 120 determines that device 101 has changed from an orientation where a proximity event is unlikely to occur (i.e. a face-up orientation or a face down orientation) to an orientation where a proximity event is likely to occur (i.e. a top-up orientation, a left-up orientation and a right-up orientation).

Returning to FIG. 4, and with further reference to FIG. 5, in response to an event occurring at block 401, at block 403, processor 120 buffers touch data 505 received via touch screen 127, for a given time period. In other words, once an event occurs, processor 120 places touch screen 127 into a mode where touch screen 127 is enabled, but touch data 505 is buffered, for example at memory 122, for a given time period without processing touch data 505. This effectively disables touch screen 127 while still monitoring touch events at touch screen 127.

At block 405, processor 120 determines whether a proximity event occurs within the given time period, as described above.

When a proximity event does not occur within the given time period (i.e. a "No" decision at block 405), at block 407, processor 120 processes buffered touch data 505, as depicted in FIG. 6. In other words, when a proximity event does not occur within the given time period, it is determined that event that occurred at block 401 was not an indication of either proximity and/or that device 101 is not to be placed in a proximity mode. While this introduces some lag between receiving and processing touch data 505, the lag is generally on the order of the given time period; as described below, the given time period for a successful prototype can range from about 100 ms to about 300 ms, and hence is generally unnoticeable to a human user of device 101. However, the given time period could be as high as about 400 ms, and still be an acceptable lag time. As the lack of occurrence of a proximity event effectively prevents device 101 from entering a proximity mode, where, for example, display 126 is turned off, the tradeoff between the lag and incorrectly turning display 126 off is acceptable.

However, when the proximity event occurs within the given time period (i.e. a "Yes" decision at block 407), at block 409, processor 120 disables touch screen 127. Buffered touch data 505 can also be discarded. Hence false actuation of touch screen 127 is prevented. Further, processor 120 generally places device 101 into a proximity mode, which can further include, but is not limited to, turning off display 126, to save power, until proximity is no longer detected. Regardless, however, processor 120 is generally enabled to not turn off display 126 within a sampling latency period of proximity sensor 136, after an initial proximity event occurs.

Further, the given time period can vary depending on whether an initial proximity event or an orientation event is detected at block 401.

For example, when processor 120 determines, at block 401, that an initial proximity event occurs at proximity sensor 136, the given time period can be set to one or more of: less than or about equal to a sampling latency period of proximity sensor 136; and less than about 100 ms. In other words, processor 120 is delayed from placing device 101 into a proximity mode until two or more proximity events occur at proximity sensor 136, and buffers touch data 505 once an initial proximity event occurs.

However, when processor 120 determines, at block 401, that a reorientation event has occurred at orientation sensor 138, the given time period can be between about 200 ms and about 300 ms, as an initial proximity event may not have yet occurred, and more time (as compared to the latency sample period of proximity sensor 136) is allowed to determine whether a proximity event will occur at proximity sensor 136. In other words, when a user raises device 101 from a face-up or face-down position to bring device 101 to his/her ear (i.e. a reorientation event occurs at orientation sensor), processor 120 buffers any touch data 505 received at touch screen 127 until it can be determined whether proximity sensor 136 detects proximity.

It is yet further appreciated that while a time period of about 100 ms is referred to above in implementations where an initial proximity event occurs at block 401, and time periods of about 200 ms to about 300 ms are referred to above in implementations where a reorientation event occurs at block 401, present implementations are not so limiting, and any suitable time periods are within the scope of present implementations, depending on the latency sample period for a given proximity sensor. Indeed, as described below, these time periods were determined experimentally using a successful prototype, but other time periods are within the scope of present implementations.

Indeed, in general at block 401, when processor 120 determines that the initial proximity event has occurred at proximity sensor 136, the given time period is less than when processor 120 determines that the reorientation event has occurred at processor 120. The given time period for each condition can be determined experimentally and can be based on the latency sample period for a given proximity sensor.

Persons skilled in the art will appreciate that there are yet more alternative implementations and modifications possible.

For example, it is appreciated that, in some implementations, only one of proximity events and reorientation events are detected at block 401. In other implementations, both proximity events and reorientation events are detected at block 401, with a given time period selected that is commensurate with which one of a proximity event and a reorientation event is first detected.

However, in some orientations, when a reorientation event is first detected, a first given time period is selected, a shorter second given time period can replace the first given time period when a proximity event is detected thereafter. For example, consider implementations where a reorientation event first occurs and a first given time period of about 300 ms is selected, within which proximity events are monitored. When an initial proximity event occurs within, for example 50 ms of the reorientation event, a given time period of 100 ms (and/or a latency sample period of proximity sensor 136) can be determined, such that the total given time period is shortened to about 150 ms (i.e. the latency between the reorientation event and the initial proximity event, added to the latency sample period of proximity sensor 136). In other words, the given time period can be the time between detecting a reorientation event and detecting an initial proximity event, added to the latency sample period of proximity sensor 136.

In any event, buffering touch data 505, after block 401, to delay processing thereof, allows processor 120 to determine whether proximity can be detected at device 101, and thereby prevent false-actuation of touch screen in the event that proximity is detected.

Further, present implementations address situations where touch screen devices are accidentally actuated by a face/ear of a user during phone calls. Specifically, present implementations prevent false actuation of touch screen controls (e.g. "hang-up" and/or "mute buttons") by a face/ear of a user, and enable actuation of touch screen controls when false positives of proximity are initially determined.

Present implementations further address a problem with infrared sensors referred to as the "touch-down" effect. Specifically, many users bring devices to their face very quickly; indeed, the dynamics can be fast enough so that a touch screen is disabled too late, and an initial "touch-down" from the user's face, ear and the like occurs at the touch screen. This is due to the high latency of infrared (IR)-based proximity detection (i.e. between an initial proximity event and a next proximity event; processing of proximity data can further contribute to latency), and can be exacerbated when a user has low-reflectance around the ear (e.g. black hair). Even with the best IR proximity detection technology currently available, this touch-down effect still occurs.

Hence, according to present implementations where proximity sensor 136 comprises an IR sensor, touch event filtering (i.e. buffering of touch data 505) occurs before disabling of touch screen 127 in which touch data 505 is buffered until "full" confirmation of proximity occurs at the IR proximity sensor to effectively "turn off" touch screen 127 and prevent touch-down. When full confirmation does not occur, the touch data 505 is processed, otherwise, touch screen 127 is disabled only when IR proximity sensor confirmation has occurred.

Again considering implementations where proximity sensor 136 comprises an IR sensor, there are two sources of events that can be used to determine proximity or lack thereof:

EVENT 1: An initial IR-based proximity event occurs (which can also be referred to as going from "far to close"). In other words, confirmation of proximity occurs when two proximity events occur in a row, but touch screen 127 is effectively temporarily disabled after the initial IR-based proximity event by accepting touch data 505, but buffering touch data 505 rather than processing touch data 505, while waiting for a next proximity event, which would confirm proximity.

EVENT 2: A reorientation event occurs when device orientation changes from "face up" (user looking at display in normal usage stance) to "top up", "right up" or "left up", which is (heuristically) the device orientations used for a majority of calls. When touch events are disabled for a small window after an orientation change, touch events are effectively and temporarily disabled when the device is likely to be approaching the user's ear. In some implementations, orientation changes that occur while device 101 is moving are ignored (for this implementation and other implementations where proximity sensor 136 is not an IR-based sensor).

In both cases, touch event disabling occurs for short given time periods. In a successful prototype, the given time period was determined to be: about 100 ms for far-to-close proximity events (equivalent to about one latency sample period of an IR proximity sensor used in the prototype); and about 200 to about 300 ms for reorientation events, (equivalent to an experimentally determined average delay between reorientation detection and arrival of the device at a user's ear).

It is further appreciated that combining data associated with the two events to pre-emptively eliminate or delay touch events generally reduces the likelihood of touch-down occurring, by discarding buffered touch data unlikely to have been received due to a deliberate user interaction.

Further, as display 126 is not shut off during a latency sample period of proximity sensor 136, at worst, when a false positive initially occurs and touch data 505 is initially buffered when it would otherwise be processed, touch data 505 is processed with some lag that occurs due to the buffering. However, as the lag was generally less than about 300 ms in the successful prototype, it was generally not noticeable, and was more acceptable than having a call accidently disconnected or muted due to false-actuation of touch screen 127.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   a processor coupled to a memory, a display including a touch screen for detecting touch events at the display, an orientation sensor, and a proximity sensor, the processor configured to:
   detect an initial proximity event at the proximity sensor and, thereafter:
   buffer in the memory touch data received via the touch screen;
   process the buffered touch data when a further proximity event does not occur within a given time period; and,
   disable the touch screen when the further proximity event occurs within the given time period,
   wherein same buffering, same processing and same disabling also occurs for a reorientation event detected at the orientation sensor, the processor being further configured to:
   set the given time period for the initial proximity event to a first value, and set the given time period for the reorientation event to a second value greater than the first value; and
   set the first value to less than or about equal to a sampling latency period of the proximity sensor.

2. The device of claim 1, wherein the processor is further configured to discard the buffered touch data when the proximity event occurs within the given time period.

3. The device of claim 1, wherein the proximity sensor is located adjacent one or more of the touch screen and a speaker.

4. The device of claim 1, wherein the given time period is set to one or more of: less than about 100 ms; and less than about 400 ms.

5. The device of claim 1, wherein the processor is further configured to turn off the display when the further proximity event occurs within the given time period.

6. The device of claim 1, wherein the orientation sensor comprises one or more of an accelerometer, a gyroscope and a magnetometer.

7. The device of claim 1, wherein the reorientation event is indicative of a change in orientation from one of a face-up orientation and face-down orientation to one of a top-up orientation, a left-up orientation and a right-up orientation.

8. The device of claim 1, wherein the proximity sensor comprises one or more of an infrared proximity sensor, a light-based proximity sensor, a sonar proximity sensor and an acoustic-based proximity sensor.

9. A method comprising:
   detecting, at a processor of a devices, an initial proximity event at a proximity sensor of the device, and thereafter:
   buffering, in a memory of the device, touch data received via a touch screen of the device;
   processing, at the processor, the buffered touch data when a further proximity event does not occur within a given time period; and,
   disabling, at the processor, the touch screen when the further proximity event occurs within the given time period,
   wherein same buffering, same processing and same disabling also occurs for a reorientation event detected at the orientation sensor;
   setting, at the processor, the given time period for the initial proximity event to a first value for the initial proximity event, and setting, at the processor, the given time period for the reorientation event to a second value greater than the first value; and,
   setting the first value to less than or about equal to a sampling latency period of the proximity sensor.

10. The method of claim 9, further comprising discarding the buffered touch data when the proximity event occurs within the given time period.

11. The method of claim 9, wherein the given time period is set to one or more of: less than about 100 ms; and less than about 400 ms.

12. The method of claim 9, further comprising turning off the display when the further proximity event occurs within the given time period.

13. The method of claim 9, wherein the reorientation event is indicative of a change in orientation from one of a face-up orientation and face-down orientation to one of a top-up orientation, a left-up orientation and a right-up orientation.

14. A computer program product, comprising a non-transitory computer usable medium having a computer readable program code adapted to be executed to implement a method comprising:
- detecting, at a processor of a devices, an initial proximity event at a proximity sensor of the device, and thereafter:
- buffering, in a memory of the device, touch data received via a touch screen of the device;
- processing, at the processor, the buffered touch data when a further proximity event does not occur within a given time period; and,
- disabling, at the processor, the touch screen when the further proximity event occurs within the given time period,
- wherein same buffering, same processing and same disabling also occurs for a reorientation event detected at the orientation sensor;
- setting, at the processor, the given time period for the initial proximity event to a first value for the initial proximity event, and setting, at the processor, the given time period for the reorientation event to a second value greater than the first value; and,
- setting the first value to less than or about equal to a sampling latency period of the proximity sensor.

* * * * *

UNITED STATES PATENT AND TRADEMARK OFFICE
CERTIFICATE OF CORRECTION

PATENT NO. : 9,001,039 B2  
APPLICATION NO. : 13/623916  
DATED : April 7, 2015  
INVENTOR(S) : Tennessee Carmel-Veilleux and Zhe Chen Page 1 of 1

It is certified that error appears in the above-identified patent and that said Letters Patent is hereby corrected as shown below:

In the Claims

Column 13, line 12, Claim 16, "devices" should read --device--.

Signed and Sealed this
Eighth Day of December, 2015

Michelle K. Lee
*Director of the United States Patent and Trademark Office*